(12) United States Patent
Li

(10) Patent No.: US 6,957,054 B2
(45) Date of Patent: Oct. 18, 2005

(54) RADIO RECEIVER HAVING A VARIABLE BANDWIDTH IF FILTER AND METHOD THEREFOR

(75) Inventor: Junsong Li, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 481 days.

(21) Appl. No.: 10/216,335

(22) Filed: Aug. 9, 2002

(65) Prior Publication Data

US 2004/0029548 A1 Feb. 12, 2004

(51) Int. Cl.[7] .............................. H04B 1/10; H04B 1/16
(52) U.S. Cl. ..................... 455/296; 455/303; 455/306; 455/307; 455/340; 455/133; 455/277.2
(58) Field of Search .................. 455/296, 303, 455/306, 307, 339, 340, 277.1, 277.2, 226.1, 229, 132, 133, 135, 136; 370/295, 343, 344

(56) References Cited

U.S. PATENT DOCUMENTS

| | | | |
|---|---|---|---|
| 5,244,869 A | * | 9/1993 | Billing ........................ 505/202 |
| 5,404,589 A | | 4/1995 | Bijker et al. |
| 5,465,410 A | | 11/1995 | Hiben |
| 5,493,717 A | | 2/1996 | Schwarz |
| 5,745,187 A | * | 4/1998 | Hulyalkar et al. .......... 348/607 |
| 5,838,675 A | * | 11/1998 | Rauscher .................... 370/343 |
| 6,091,704 A | * | 7/2000 | Butash ........................ 370/210 |
| 6,201,795 B1 | * | 3/2001 | Baum et al. ................ 370/252 |
| 6,351,451 B1 | * | 2/2002 | Butash ........................ 370/210 |
| 6,658,245 B2 | * | 12/2003 | Li et al. ..................... 455/307 |

FOREIGN PATENT DOCUMENTS

EP   0887944 A2   12/1998

OTHER PUBLICATIONS

PCT/US03/22938 International Search Report.
Vaidyanathan, "Multirate Systems and Filter Banks," Prentice Hall P T R, Section 4.6, Chapter 4, pp. 151–166 (1993).

* cited by examiner

Primary Examiner—Duc M. Nguyen
(74) Attorney, Agent, or Firm—Daniel D. Hill; Joanna G. Chiu

(57) ABSTRACT

A radio receiver (100) has an IF (intermediate frequency) filter (200) for automatically adjusting its intermediate frequency. The filter (200) includes a filter bank (304), an accumulative sub-band formation (322) and an accumulative sub-band power estimator/switch control (324). The filter bank (304) generates sub-bands, each sub-band having a predetermined frequency range. The accumulative sub-band formation (322) selectively sums the sub-bands to provide lowpass filters having incrementally increasing bandwidth. Power estimates of the lowpass filters are used to determine which lowpass filter output is appropriate for adjacent station interference. Also, if there is no adjacent station interference, the IF filter (200) selects the appropriate filter output depending on the signal strength of the desired station.

27 Claims, 6 Drawing Sheets

RADIO RECEIVER HAVING A VARIABLE BANDWIDTH IF FILTER AND METHOD THEREFOR

REFERENCE TO RELATED COPENDING APPLICATIONS

The present application is related to a United States Patent application by Junsung Li et al. having application Ser. No. 09/818,337, filed on Mar. 28, 2001, entitled "Radio Receiver Having a Dynamic Bandwidth Filter and Method Therefor" and assigned to the assignee hereof.

The present application is related to a United States Patent Application by Junsung Li et al. having application Ser. No. 10/079,352, filed on Feb. 20, 2002, entitled "Radio Receiver Having an Adaptive Equalizer and Method Therefor: and assigned to the assignee hereof.

FIELD OF THE INVENTION

The present invention relates generally to radio receivers and more specifically to radio receivers having a variable bandwidth intermediate frequency (IF) filter and method therefor.

RELATED ART

In broadband FM (frequency modulation) broadcasting systems, one of the most important features of the system is that the bandwidth of the FM modulated signal (radio signal) change with the envelope of the modulating signal (audio signal). However, in traditional FM receivers, the bandwidth of the intermediate frequency stage is fixed (about 100 KHz, single-sided band). When the received FM signal strength is weak, it may become difficult to have good stereo separation due to excessive noise effects. Also, interference from an adjacent station (typically about 200 KHz away from the desired station) will degrade the signal quality or even completely replace the desired station signal if the interfering signal is very strong due to the capture effect of the nonlinear demodulation process. Therefore, it would be desirable to have an FM receiver that can automatically adjust its IF (intermediate frequency) bandwidth according to signal reception conditions.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

Figure 1:
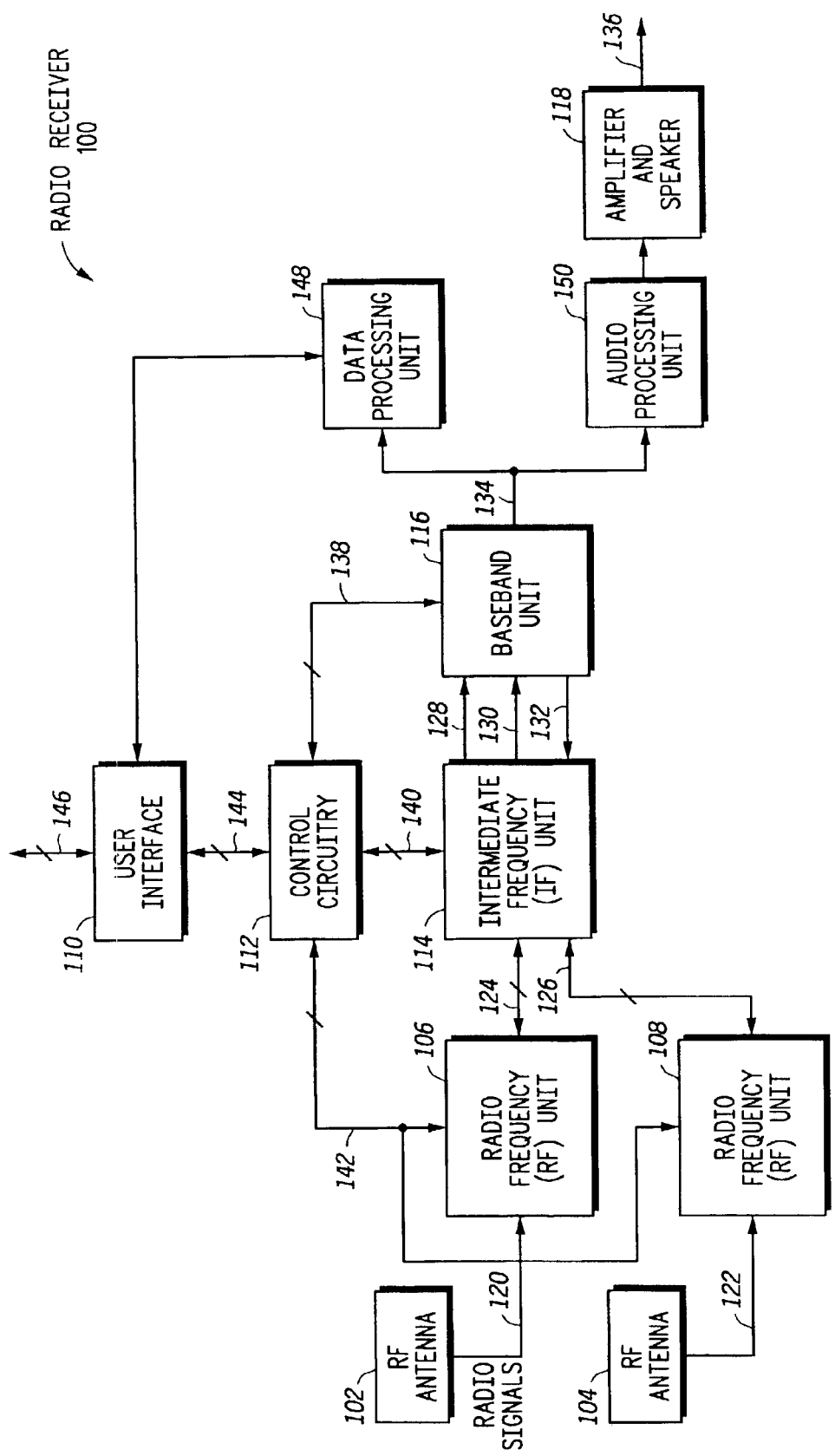
FIG. 1 illustrates, in block diagram form, a radio receiver in accordance with one embodiment of the present invention.

FIG. 1 illustrates a radio receiver 100 in accordance with one embodiment of the present invention. Radio receiver 100 includes user interface 110 bi-directionally coupled via conductors 144 to control circuitry 112. Control circuitry 112 is coupled to radio frequency (RF) units 106 and 108 via conductors 142, to intermediate frequency (IF) unit 114 via conductors 140, and baseband unit 116 via conductors 138. RF Unit 106 is coupled to RF antenna 102 via conductor 120 and is bi-directionally coupled to IF unit 114 via conductors 124. RF Unit 108 is coupled to RF antenna 104 via conductor 122 and is bi-directionally coupled to IF unit 114 via conductors 126. IF unit 114 is coupled to baseband unit 116 via conductors 128, 130 and 132. Baseband unit 116 is coupled to audio processing unit 150 and data processing unit 148 via conductor 134. Audio processing unit 150 is coupled to amplifier and speaker 118 which provides output signals via conductor 136. Data processing unit 148 is bidirectionally coupled to user interface 110. Also, users may provide and receive information to and from user interface 110 via conductors 146.

In operation, RF antennas 102 and 104 capture radio signals and provide them to RF Units 106 and 108, respectively. RF Units 106 and 108 translate the received radio signals to a common intermediate frequency range as dictated by the design of the radio receiver. That is, RF Units 106 and 108 may translate the frequency of the received radio signals to a lower frequency or to a higher frequency depending on the requirements of IF Unit 114 (and thus may be referred to as a "lower frequency unit" or a "higher frequency unit.") IF unit 114 receives the IF signals via conductors 124 and 126 and digitizes them through the use of an analog to digital converter. IF unit 114 also performs digital mixing to produce in-phase and quadrature digitized signals which are output via conductors 128 and 130 to base band unit 116. In alternate tuner embodiments, IF unit 114 is optional. That is, RF units 106 and 108 may translate the received radio signals from antennas 102 and 104 directly to base band and may include an analog to digital converter to provide the digitized base band signals directly to baseband unit 116.

Baseband unit 116 receives the digitized radio signals from intermediate frequency unit 114 or, if the IF unit does not exist in the specific embodiment, directly from RF units 106 and 108. Baseband unit 116 performs signal conditioning, demodulation, and decoding in order to produce audio and data information via conductor 134. The processing performed by baseband unit 116 will be further described in reference to later figures. Audio information via conductor 134 may be provided to audio processing unit 150 which may be coupled to amplifier and speaker 118 to produce an audio output from receiver 100 via conductor 136. For example, this may be music played from audio speakers. Alternatively, baseband unit 116 may output data information via conductor 134 to data processing unit 148 for further processing. The output of data processing unit 148 may be coupled to user interface 110 to allow user interaction with the output of receiver 100. For example, user interface 110 may represent a radio dial, a touch screen, monitor and keyboard, keypad, or any other suitable input/output device. The data information may represent text, graphics, or any other information transmitted in digital form.

In alternate embodiments, radio receiver 100 may be used for different formats of data such as AM, FM, GPS, digital T.V., T.V., digital/audio broadcast, audio broadcast, digital/video broadcast, or the like. Furthermore, receiver 100 may be designed to receive frequencies other than radio frequencies. Antennas 102 and 104 may therefore be referred to as sensors capable of sensing a variety of data formats. Furthermore, each of the sensors or antennas in the system may receive different formats of data so that, for example, one sensor may receive radio signals while other sensors may receive different types of data as listed above. Also, receiver 100 of FIG. 1 illustrates two sensors or antennas (e.g. antennas 102 and 104); however, alternate embodiments may use any number of sensors for capturing signals or information.

Figure 2:
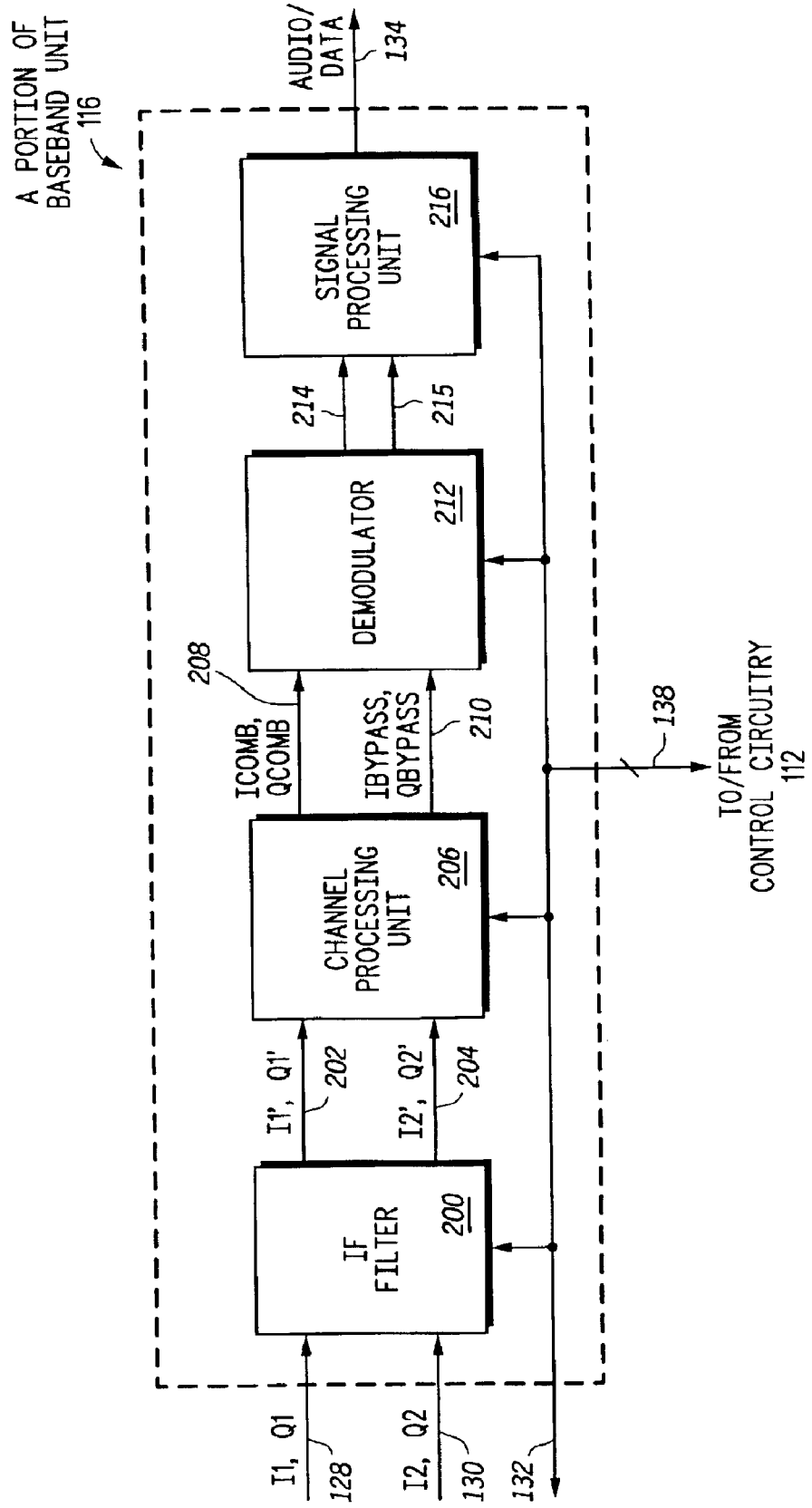
FIG. 2 illustrates, in block diagram form, a portion of the baseband unit of FIG. 1 in more detail.

FIG. 2 illustrates one embodiment of a portion of baseband unit 116. IF filter 200 receives in-phase and quadrature signal pairs I1, Q1 and I2, Q2 via conductors 128 and 130, respectively, where I1, Q1 corresponds to the signal received via sensor or antenna 102 and I2, Q2 corresponds to the signal received via sensor or antenna 104. I1 and I2 represent the digitized in-phase signals while Q1 and Q2 represent the digitized quadrature signals (e.g. signals that are 90 degrees out of phase as compared to the in-phase signals). (Note also that each signal such as I1, Q1 and I2, Q2 can be represented as a complex number where I1 and I2 represent the real portions and Q1 and Q2 represent the imaginary portions, as will be discussed further below.) IF filter 200 is coupled to channel processing unit 206 via conductors 202 and 204. Channel processing unit 206 is coupled to demodulator 212 via conductors 208 and 210, and demodulator 212 is coupled to signal processing unit 216 via conductors 214 and 215. Signal processing unit 216 provides audio/data information via conductor 134. IF filter 200, channel processing unit 206, demodulator 212, and signal processing unit 216 are coupled to control circuitry 112 via conductors 138. Conductors 138 may be referred to as a control bus including a variety of conductors for transferring different signals to and from units 200, 206, 212 and 216. Conductor 132, for example, may include a subset of conductors 138 or may be the full bus 138 which is provided back to intermediate frequency unit 114. Therefore, control signals received via conductor 138 may be transmitted to IF frequency unit 114 via conductor 132. Likewise, these control signals or subsets of these signals may be transmitted back to the RF units 106 and 108 via conductors 124 and 126. Alternatively, control signals may be sent directly from control circuitry 112 to radio frequency units 106 and 108 via conductor 142.

In operation, IF filter 200 removes unwanted signals and noise from the desired frequency range of incoming signals I1, Q1, and I2, Q2. IF filter 200 also suppresses adjacent channels in order to produce filtered in-phase and quadrature signal pairs I1', Q2', and I2', Q2', where I1', Q1' corresponds to I1, Q1 and I2', Q2' corresponds to I2, Q2. Channel processing unit 206 receives I1', Q1' and I2', Q2' and combines these to produce a single combination signal Icomb, Qcomb. Alternatively, if RF units 106 and 108 are tuned to different frequencies then channel processing unit 206 may also provide one or both of its incoming signals such as I1', Q1' or I2', Q2' directly to demodulator 212 via conductors 208 and 210 as Ibypass, Qbypass. Therefore, channel processing unit 206 provides the option of combining its incoming digitized signals or bypassing them directly to further processing units such as demodulator 212. Channel processing unit 206 may also provide both a combined signal such as Icomb, Qcomb and bypass signals such as Ibypass, Qbypass. However, in the case where both channels are bypassed, signals Icomb, Qcomb are used as bypass signals as well. Channel processing unit 206 and Ibypass, Qbypass also provide the ability to receive different types of signal formats such that one signal, such as I1', Q1', may be processed by channel processing unit 206 and output via conductor 208 while a second signal, such as I2', Q2', may be a different signal format that is directly bypassed to demodulator 212. This allows channel processing unit 206 to provide either a single combination signal or various different signals for further processing. For example, one antenna may provide signals from one radio station while a second antenna may provide signals from a second radio station or of a different data format all together. Channel processing unit 206 may also perform noise reduction on the received signals.

Also note that the embodiment illustrated in FIG. 2 illustrates only two signals received by IF filter 200 and channel processing unit 206. However, as was discussed in reference to FIG. 1, receiver 100 may include any number of antennas such as 102 and 104. In this embodiment, each antenna would provide its own in-phase and quadrature signal pair such as I1, Q1 to IF filter 200. Also, IF filter 200 may provide a plurality of filtered in-phase and quadrature signal pairs corresponding to each of the antennas. In this manner, channel processing unit 206 may output a single combination signal or multiple subcombinations of signals, as appropriate. In addition, channel processing unit 206 may provide multiple bypass signals so that more than one incoming signal may be directly bypassed to further processing units such as demodulator 212.

Demodulator 212 receives signals Icomb, Qcomb and Ibypass, Qbypass from channel processing unit 206 and provides demodulated signals to signal processing unit 216 via conductors 214 and 215. Also, if demodulator 212 receives signals Ibypass, Qbypass, demodulator 212 may provide a demodulated Ibypass, Qbypass, also via conductors 214 and 215 to signal processing unit 216. However, as discussed above, Ibypass, Qbypass is optional. For example, in one embodiment, demodulator 212 may be an FM demodulator providing multiplex (MPX) signals corresponding to each of its incoming signals (e.g. Icomb, Qcomb and Ibypass, Qbypass). In alternate embodiments, demodulator 212 may be an AM demodulator or a demodulator specific to any other signal format as required by the system (e.g. receiver 100) and incoming signals I1, Q1 and I2, Q2. Signal processing unit 216 may perform further processing on the signals received via conductors 214, 215 and outputs audio/data information via conductor 134. Audio/data information may include just audio information, just data information or a combination of both audio and data information. This data may then be output to various different systems such as data processing systems or audio processing systems, as illustrated in FIG. 1. For example, in an FM receiver, demodulator 212 outputs an MPX signal to signal processing unit 216 as discussed above. In this embodiment, signal processing unit 216 receives the MPX signal and performs stereo decoding in order to provide the proper signals to each speaker. For example, the MPX signal may be decoded utilizing a pilot tone to provide left and right speaker signals in a stereo system. Also, signal processing unit 216 may demodulate other sub-carrier signals (e.g. RDS or DARC) to provide further information to subsequent processing units.

Figure 3:
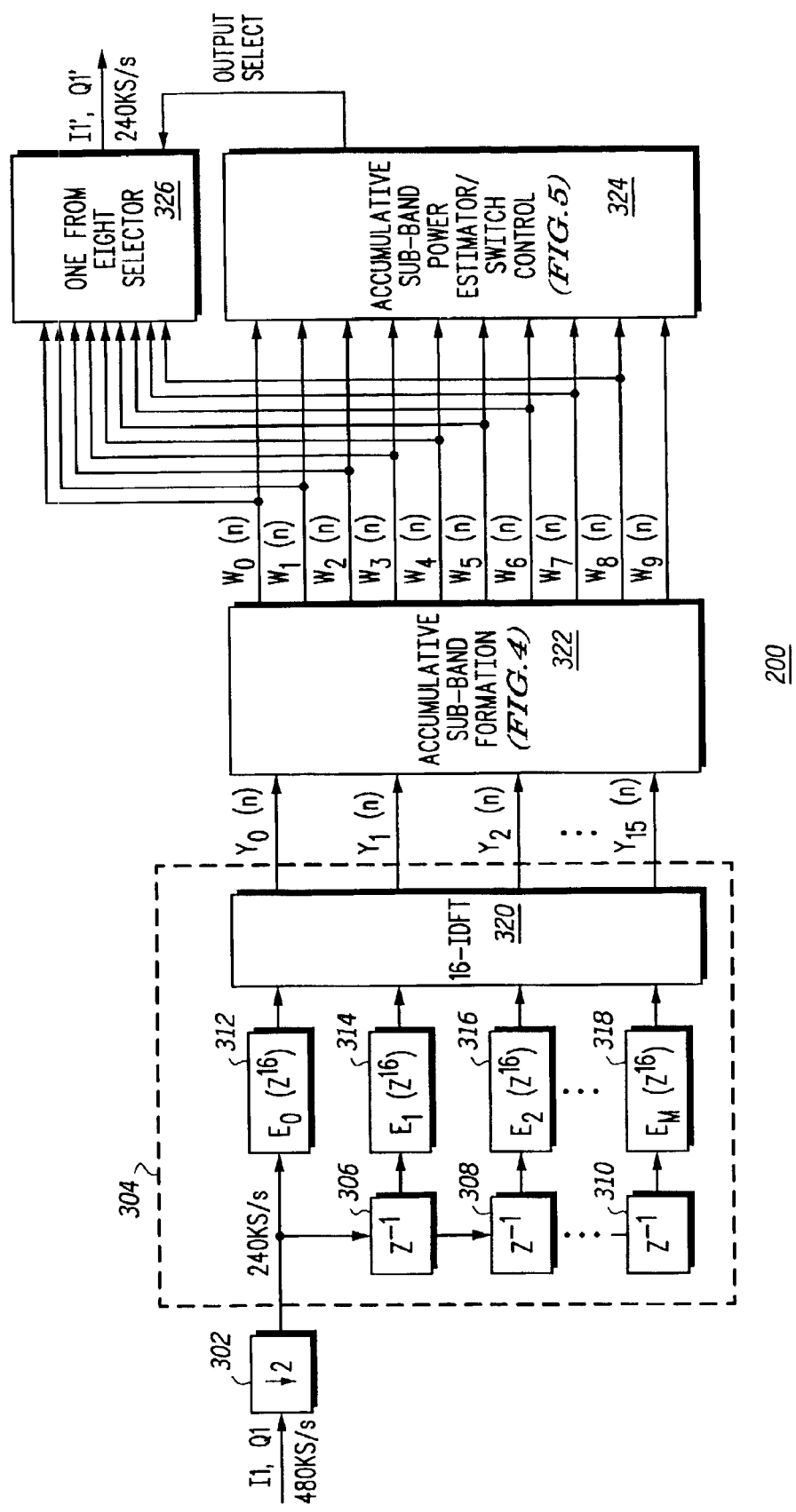
FIG. 3 illustrates, in block diagram form, the IF filter of FIG. 2 in more detail.

FIG. 3 illustrates, in block diagram form, IF filter 200 of FIG. 2. Filter portion 200 includes decimator 302, filter bank 304, accumulative sub-band formation 322, accumulative sub-band power estimator/switch control 324, and one from eight selector 326. In the illustrated embodiment, IF filter 200 also includes an additional filter portion that is substantially identical to filter portion 300. The additional filter portion would be coupled between conductors 130 and 204 in FIG. 2.

Decimator 302 has an input for receiving incoming signals I1, Q1 at a data rate of 480 KS/s, and an output for providing decimated signals at a data rate of 240 KS/s. Filter bank 304 includes polyphase subfilter 312, 314, 316, and 318, delay elements 306, 308, and 310, and 16 point inverse discrete fourier transform (IDFT) 320. Polyphase subfilters 312, 314, 316, and 318 are implemented by the filter function F(z), where $$F(z) = E_0(z^{16}) + z^{-1}E_1(z^{16}) + z^{-2}E_3(z^{16}) \ldots + z^{-15}E_{15}(z^{16})$$

and where $E_i$ is the i-th polyphase component of the prototype lowpass filter F(z). Filter function F(z) is designed as a 16-band Nyquist type filter and has a linear phase frequency response. Filter bank 304 is implemented, for example, by using a technique described in "Multirate Systems and Filter Banks", by P. P. Vaidyanatha, page 165, published in 1993 by Prentice Hall. However, there are other ways to implement filter bank 304, such as for example, directly implementing a plurality of complex bandpass filters. The filters of the illustrated embodiment must have characteristics such that the phase linearity and flat passband characteristics of a partial or whole sum are preserved.

Figure 7:
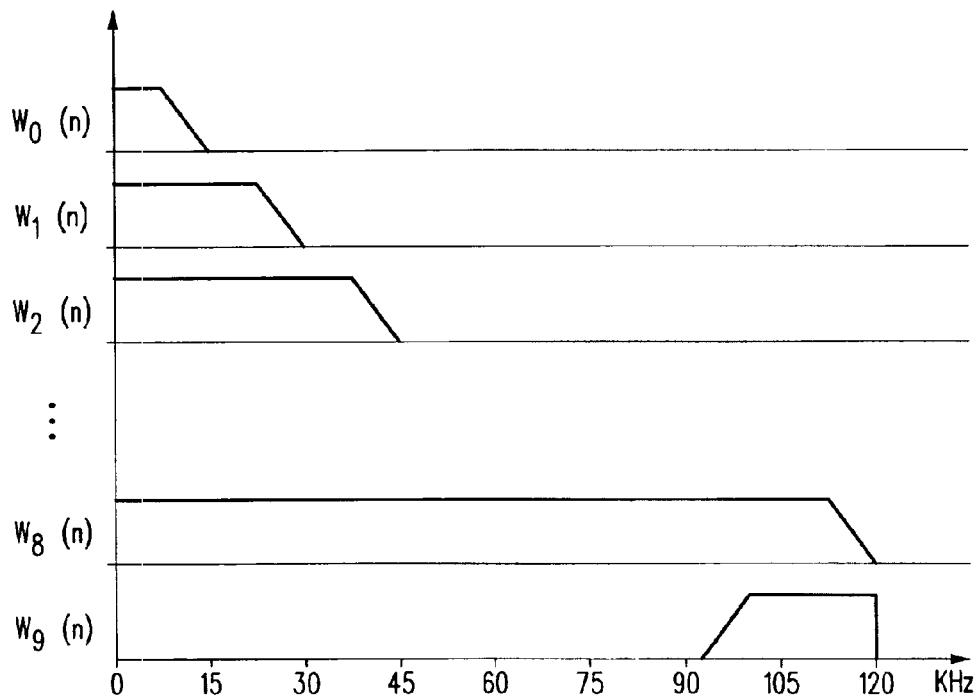
FIG. 7 is a graphic representation of the spectrum distribution of the output of the accumulative sub-band formation of FIG. 3.

Outputs $Y_0(n)$–$Y_{15}(n)$ are summed together by sub-band formation 320 to be equivalent to the downsampled signals corresponding to input signals I1, Q1, where n is the time index. Each of output signals $Y_0(n)$–$Y_{15}(n)$ is a bandpass filter having a certain predetermined passband having a center frequency 15 KHz larger than the previous bandpass filter. Outputs $Y_0(n)$–$Y_{15}(n)$ are provided as inputs to accumulative sub-band formation 322. Sub-band formation 322 forms a set of low-pass filtered signals $w_0(n)$–$w_8(n)$, except for signal $w_9(n)$ which is a bandpass filtered signal The passband of each subsequent low-pass filter is 15 KHz larger than the preceding low-pass filter. Signals $w_0(n)$–$w_9(n)$ are illustrated in FIG. 7. The set of output signals $w_0(n)$–$w_9(n)$ is provided to input terminals of accumulative sub-band power estimator/switch control 324 and signals $w_0(n)$–$w_9(n)$ are provided to inputs of one of eight selector 326. Note that in the illustrated embodiment, 16 bandpass filtered signals $Y_0(n)$–$Y_{15}(n)$ are used. However, in other embodiments, there may be more or fewer than 16 filtered signals.

Accumulative sub-band power estimator/switch control 324 receives signals $w_0(n)$–$w_9(n)$, and estimates the power in each signal. The power estimates are compared to predetermined threshold values and used to determine if there is adjacent station interference. If there is adjacent station interference, control signals are provided to one from eight selector 326 to select a low pass signal with a smaller passband. If no adjacent station interference is detected, then the power estimates are used to determine if the desired station is a relatively weak station requiring a different passband than if the station is relatively strong. The function of accumulative sub-band power estimator/switch control 324 will be described in more detail below in the discussion of FIG. 5. One from eight selector 326 has an output for providing I1', Q1' at the 240 KS/s rate.

Figure 4:
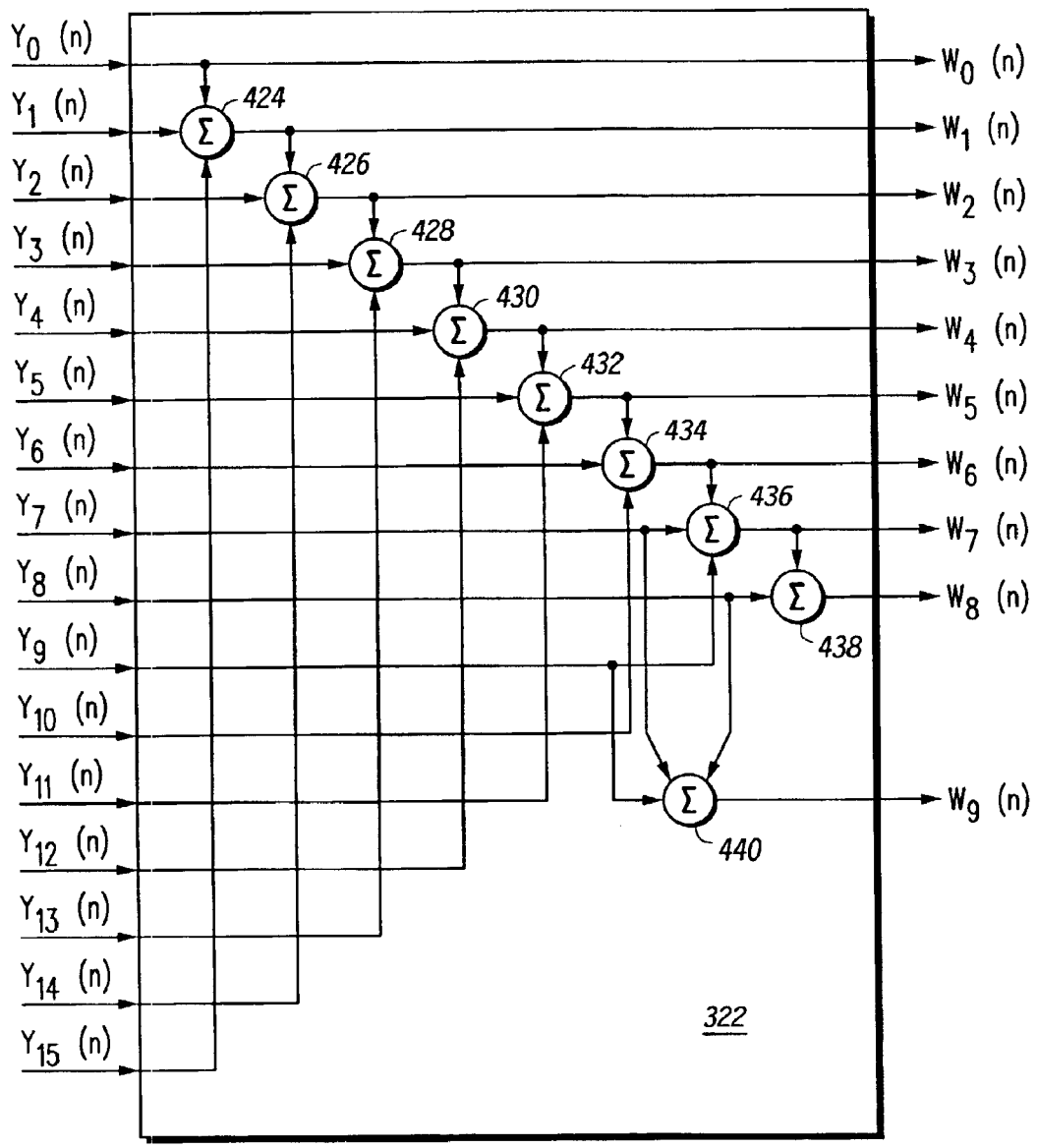
FIG. 4 illustrates, in logic diagram form, the accumulative sub-band formation of FIG. 3.

In operation, decimator 302 receives the digitized inphase and quadrature signals I1 and Q1 from IP unit 114. Decimator 302 is implemented as a bandpass filter, provides additional stopband attenuation and allows a reduction of the sample rate from 480 KS/s (kilo samples per second) to 240 KS/s. The additional attenuation of the decimator allows for a simpler filter bank and the reduction in sample rate reduces the computations needed to implement filter portion 200. In the illustrated embodiment, the Nyquist frequency bandwidth is partitioned into M sub-bands, where M is equal to 16. In other embodiments, M can be any number of sub-bands. Filter bank 304 is a filter composed of many sub-filters that are designed with particular characteristics so that the sub-bands are added together to form the whole signal. Bandwidth control of filter bank 304 is not affected by the choice of transfer function or filter. This eliminates a need to open up the bandwidth of the filter to check conditions, and thus risk allowing a degraded signal through the filter. Digital filter bank 304 decomposes the signal received on conductor 128 into multiple sub-band signals. Each sub-band filter has a linear-phase response. When some or all of the sub-band filters are summed together, a flat-passband and linear-phase bandpass filter are obtained. FIG. 4 details how the sub-bands are summed together.

Figure 6:
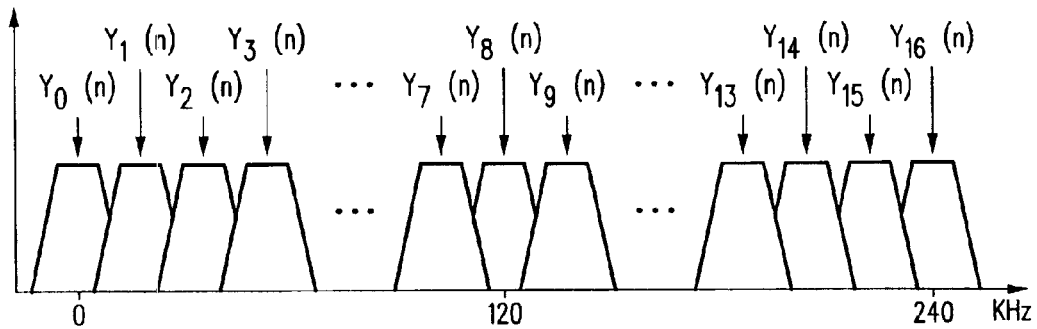
FIG. 6 is a graphic representation of the spectrum distribution of the output of the IDFT of FIG. 3.

FIG. 4 illustrates, in logic diagram form, accumulative sub-band formation 322 of FIG. 3. Accumulative sub-band formation 322 includes a plurality of summation circuits 424, 426, 428, 430, 432, 434, 436, 438, and 440 for summing together the complex bandpass filtered signals $Y_0(n)$–$Y_{15}(n)$, illustrated in FIG. 6, to create complex accumulative lowpass filtered signals $w_0(n)$–$w_9(n)$ as illustrated in FIG. 7. Note that $Y_0(n)$ is not summed and is passed through to become $w_0(n)$ because its center frequency is zero hertz. Note that signals $Y_7(n)$, $Y_8(n)$, and $Y_9(n)$ are summed together to become $w_9(n)$. $Y_7(n)$, $Y_8(n)$, and $Y_9(n)$ are treated as adjacent interference indicators because for FM, the first adjacent interference is about 100–200 KHZ from the desired signal. Also, the sample rate is 240 KS/s, which means that the maximum frequency that can be recognized by the system is about 120 KHz. Therefore, after filtering by the RF section and any other prefiltering, (such as prefiltering done by decimator 302) the residual interference energy is concentrated in the highest frequency sub-bands.

Figure 5:
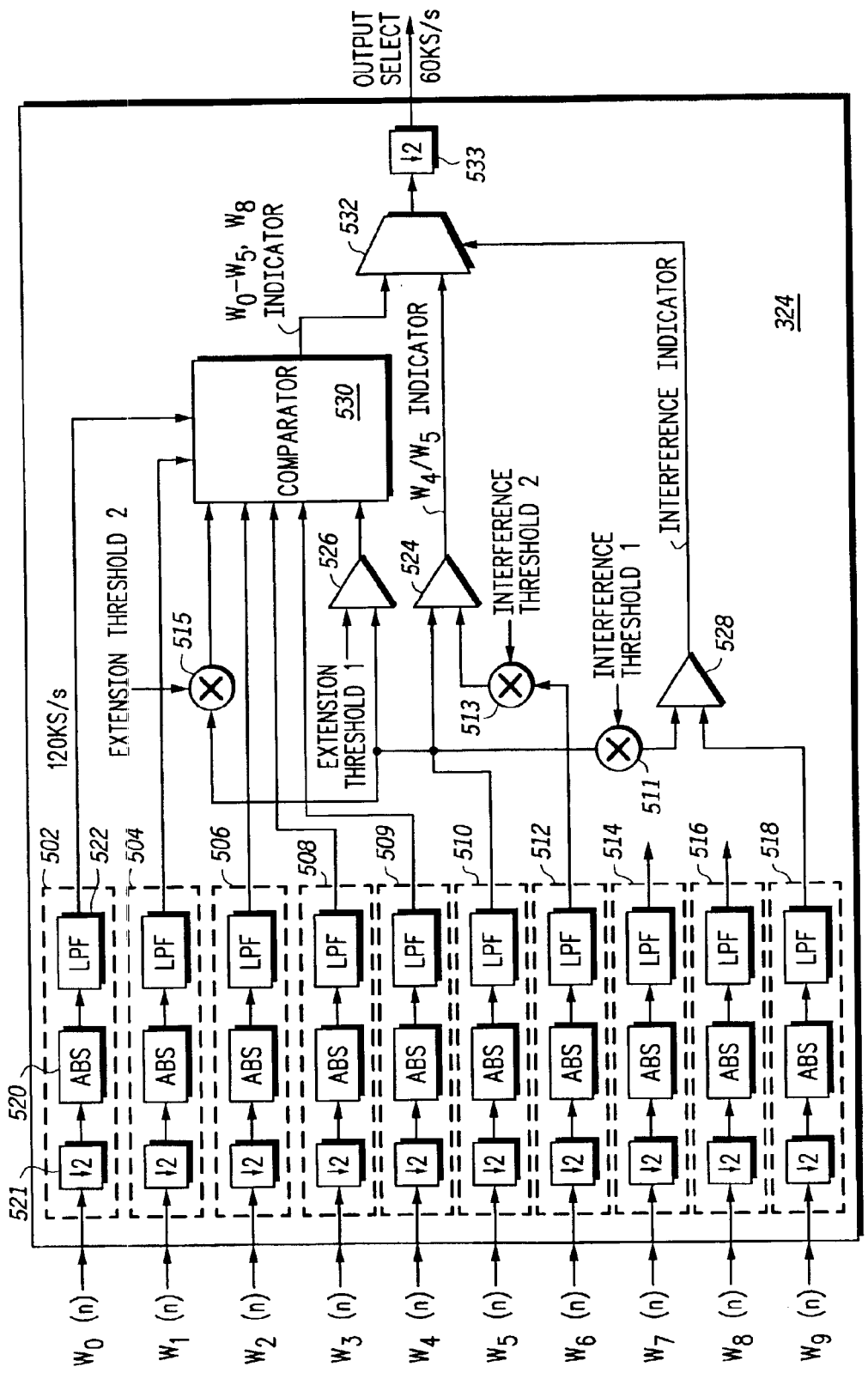
FIG. 5 illustrates, in block diagram form, the accumulative sub-band power estimator/switch control circuit of FIG. 3.

FIG. 5 illustrates, in block diagram form, accumulative sub-band power estimator/switch control circuit 324 of FIG. 3. Accumulative sub-band power estimator/switch control circuit 324 includes a plurality of power estimators 502, 504, 506, 508, 510, 512, 514, 516, and 518 for determining an individual estimated power for each of the accumulative lowpass filtered signals $w_0(n)$–$w_9(n)$. Power estimator 502 includes a decimator 521, absolute value calculator 520, and LPF 522. Each of the other power estimators is similar to power estimator 502. Switch control circuit 324 also includes multipliers 511, 513, and 515, comparators 524, 526, and 528, multiplexer 532, and decimator 533. Before each power estimate determination, the signals $w_0(n)$–$w_9(n)$ are downsampled by a factor of 2. For example, $w_0(n)$ is downsampled using decimator 521. However, in other embodiments, the sample rate of the power estimation may be reduced further. Note that in the illustrated embodiment, power estimates are used. In other embodiments, other parameters may be monitored, such as for example, amplitude or energy of the sub-band signals.

To determine if there is adjacent station interference, an output of LPF 510 is multiplied with an interference threshold value labeled "INTERFERENCE THRESHOLD 1" by multiplier 511. Comparator 528 compares the output of multiplier 511 with the output of power estimators 518 to produce an interference indicator signal labeled "INTERFERENCE INDICATOR". The interference indicator is used as a control input for multiplexer 532. If the output of LPF 518 is greater than the output of multiplier 511, then interference is present. The output of LPF 512 is multiplied by INTERFERENCE THRESHOLD 2 and the result is compared, using comparator 524, to the output of LPF 510. If LPF 510 is greater than the output multiplier 513, then $W_5(n)$ is selected by one from eight selector 326 to be output. If the output of multiplier 513 is greater than the output of LPF 510, than $W_4(n)$ is selected by one from eight selector 326 to be output on line 202 to channel processing unit 206 of FIG. 2.

In the case where the output of comparator 528 indicates no adjacent station interference, then the output of LPF 510 is compared with an extension threshold labeled "EXTENSION THRESHOLD 1" by comparator 526 to determine if the signal of the desired station can be classified as weak. If the signal is classified as being relatively strong, than $w_8(n)$ is selected as the output by one from eight selector 326. In the case where the signal is weak, the output of LPF 510 is multiplied by an extension threshold labeled "EXTENSION THRESHOLD 2" using multiplier 515. Normally, FM signal bandwidth is about 75 KHz (single-side), so that lowpass filtered signal $W_5(z)$ (which has a bandwidth of about 75 KHz) contains most of the desired signal energy. The output of multiplier 515 is compared to the outputs of LPF 502, 504, 506, 508, and 509 by comparator 530 in sequence starting with the output of LPF 502. If the output of LPF 502 is larger than the output of multiplier 515, than $w_0(n)$ is selected by one from eight selector 326 as the output because, through experimentation, $w_0(n)$ has been determined to contain most of the energy of the desired station signal, thus providing a good representation of the desired station. If signal $w_0(n)$ is not strong enough, as indicated by an unfavorable comparison with the output of multiplier 515, then $w_1(n)$ used to compare with the output of multiplier 515. Likewise, subsequent signals $w_2(n)$, $w_3(n)$, through $w_4(n)$, via LPF 506, 508, 509, respectively, are compared to the output of multiplier 515 when the previous comparison is unfavorable. Because the determination of adjacent station interference and the weak station determination does not need to be output at a high sample rate (e.g. 120 KS/s), the sample rate is reduced using decimator 533 to further reduce the number of required calculations. Note that the illustrated embodiment does not make use of the outputs of LPF 5

As discussed above in the discussion of FIGS. 3 and 4, FIG. 6 is a graphic representation of the spectrum distribution of the output of IDFT 320 of FIG. 3, and FIG. 7 a graphic representation of the spectrum distribution of the output of accumulative sub-band formation 322 of FIG. 3.

A status circuit (not shown) may be included with filter 200 to provide an indication as to which sub-band is permitted to be output and what reception quality exists. The invention can be used in any of a number of products, such as for example, an FM receiver, an AM receiver, a land mobile phone, a television receiver, a personal digital assistant product, a computer, a wireless communication device, a satellite receiver or an OFDM (orthogonal frequency division multiplexer) receiver.

By implementing filter 200 as described above, it is possible to automatically select a filter with the most appropriate passband to reject adjacent channel energy and to shrink the effective bandwidth of the filter in low frequency deviation or noisy conditions. In addition, filter 200 provides the above functionality with a relatively less complex implementation than some previous IF filter embodiments.

In the foregoing specification, the invention has been described with reference to specific embodiments. However, one of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A receiver comprising:
   a filter bank for receiving an input signal and generating a first set of sub-band signals;
   a sub-band formation unit for receiving the first set of sub-band signals and producing a second set of sub-band signals, the second set of sub-band signals comprising an adjacent interference measurement signal, and wherein the second set of sub-band signals comprises a plurality of accumulative lowpass filtered sub-band signals, wherein each of the plurality of accumulative lowpass filtered sub-band signals is formed from a combination of at least two sub-band signals of the first set of sub-band signals; and
   a control unit for receiving the second set of sub-band signals and selecting a sub-band signal from the second set of sub-band signals based at least in part on the adjacent interference measurement signal.

2. The receiver of claim 1, wherein the control unit comprises a plurality of power estimators for providing a plurality of power estimations, each power estimator coupled to receive a predetermined sub-band signal of the second set of sub-band signals and provides a power estimation of the predetermined sub-band signal.

3. The receiver of claim 2, wherein the control unit further comprises a first comparator for comparing a power estimation of the adjacent measurement signal to a power estimation of another predetermined sub-band signal of the second set of sub-band signals and providing an adjacent interference indicator in response thereto.

4. The receiver of claim 3, wherein the control unit further comprises a second comparator for comparing a power estimation of a first predetermined sub-band signal of the second set of sub-band signals to an extension threshold, the second comparator providing an extension indicator in response thereto.

5. The receiver of claim 4, wherein the control unit further comprises a third comparator for receiving a portion of the plurality of power estimations and the extension indicator, the third comparator selectively providing, based on the extension indicator, a selected power estimation of the portion of the plurality of power estimations in response thereto.

6. The receiver of claim 5, wherein the control unit selectively provides a sub-band signal of the second set of sub-band signals corresponding to the selected power estimation as the selected sub-band signal based on the adjacent interference indicator.

7. The receiver of claim 5, wherein each of the portion of the plurality of power estimations corresponds to a sub-band signal of the second set of sub-band signals having a passband less than or equal to a passband of the first predetermined sub-band signal.

8. The receiver of claim 1, wherein the first set of sub-band signals comprises complex band pass filtered sub-band signals.

9. The receiver of claim 8, wherein the first set of sub-band signals comprises 16 complex band pass filtered sub-band signals.

10. The receiver of claim 1, wherein the receiver receives signals in a product selected from a group consisting of an FM receiver, an AM receiver, a land mobile phone, a television receiver, a personal digital assistant product, a computer, a wireless communication device, a satellite receiver, and an OFDM (orthogonal frequency division multiplexer) receiver.

11. A receiver comprising:
 a filter bank for receiving an input signal and generating a plurality of bandpass filtered sub-band signals;
 an accumulative sub-band formation unit for receiving the plurality of bandpass filtered sub-band signals and producing a plurality of lowpass filtered sub-band signals and an adjacent interference measurement signal;
 a monitoring circuit coupled to the accumulative sub-band unit, the monitoring circuit measuring a predetermined parameter of each of the lowpass filtered sub-band signals and the adjacent interference measurement signal and providing a plurality of parameter signals in response thereto;
 a control circuit coupled to the monitoring circuit for receiving the plurality of parameter signals, the control circuit selecting one of the plurality of parameter signals based at least in part on the parameter signal corresponding to the adjacent interference measurement signal; and
 an output selector coupled to the control unit for receiving the plurality of lowpass filtered sub-band signals, the output selector providing one of the lowpass filtered sub-band signals as an output signal, the one of the lowpass filtered sub-band signals corresponding to the selected one of the plurality of parameter signals.

12. The receiver of claim 11, wherein the plurality of lowpass filtered sub-band signals have an increasing passband.

13. The receiver of claim 11, wherein a portion of the plurality of lowpass filtered sub-band signals are formed using a combination of at least two of the bandpass filtered sub-band signals.

14. The receiver of claim 13, wherein the adjacent interference measurement signal is formed using a combination of at least two of the bandpass filtered sub-band signals.

15. The receiver of claim 11, wherein the control unit further comprises:
 a comparator for comparing the parameter signal corresponding to the adjacent interference measurement signal to a first predetermined one of the parameter signals, the first comparator providing an adjacent interference indicator in response thereto; and
 a second comparator for comparing a second predetermined one of the parameter signals to an extension threshold.

16. The receiver of claim 15, wherein the control unit futher comprises:

a third comparator coupled to receive a first portion of the parameter signals and the extension indicator, the third comparator selectively providing one of the first portion of the parameter signals as the selected parameter signal based on the extension indicator and the adjacent interference indicator; and
 a fourth comparator coupled to receive a second portion of the parameter signals, the fourth comparator selectively providing one of the second portion of the parameter signals as the selected parameter signal based on the adjacent interference indicator.

17. The receiver of claim 11, wherein the receiver receives signals in a product selected from a group consisting of an FM receiver, an AM receiver, a land mobile phone, a television receiver, a personal digital assistant product, a computer, a wireless communication device, a satellite receiver, and an OFDM (orthogonal frequency division multiplexer) receiver.

18. A method of dynamic filtering in a receiver, comprising:
 receiving an input signal;
 generating a plurality of bandpass filtered sub-band signals from the input signal;
 generating a plurality of lowpass filtered sub-band signals from the plurality of bandpass filtered sub-band signals;
 using a predetermined one of the plurality of lowpass filtered sub-band signals to select one of the plurality of lowpass filtered sub-band signals; and
 providing the selected one of the plurality of lowpass filtered sub-band signals as an output signal.

19. The method of claim 18, further comprising generating power estimations for each of the plurality of lowpass filtered sub-band signals.

20. The method of claim 19, wherein a power estimation of the predetermined one of the plurality of lowpass filtered sub-band signals is used to indicate whether adjacent interference exists.

21. The method of claim 20, wherein the power estimation of the predetermined one of the plurality of lowpass filtered sub-band signals is compared to a power estimation of a second predetermined one of the plurality of lowpass filtered sub-band signals and an interference threshold to indicate whether adjacent interference exists.

22. The method of claim 21, further comprising:
 if adjacent interference exists, comparing a power estimation of a third predetermined one of the plurality of lowpass filtered sub-band signals and a fourth predetermined one of the plurality of lowpass filtered sub-band signals, using a second interference threshold, to selecte the selected one of the plurality of lowpass filtered sub-band signals.

23. The method of claim 21, wherein if adjacent interference exists, the selected one of the plurality of lowpass filtered sub-band signals is selected such that a passband of the selected one of the plurality of lowpass filtered sub-band signals rejects the adjacent interference.

24. The method of claim 21, further comprising performing range extension if adjacent interference does not exist.

25. The method of claim 24, wherein performing range extension comprises:
 comparing a power estimation of a fifth predetermined one of the plurality of lowpass filtered sub-band signals to an extension threshold;
 if the power estimation of the fifth predetermined one of the plurality of lowpass filtered sub-band signals is greater than the extension threshold, providing one of the plurality of lowpass filtered sub-band signals as the selected one of the plurality of lowpass filtered sub-band signals, wherein the selected one of the plurality of lowpass filtered sub-band signals has a passband that prevents attenuation of the input signal; and if the power estimation of the third predetermined one of the plurality of lowpass filtered sub-band signals is not greater than the extension threshold, providing one of the plurality of lowpass filtered sub-band signals as the selected one of the plurality of lowpass filtered sub-band signals, wherein the selected one of the plurality of lowpass filtered sub-band signals has a passband that is equal to or less than the passband of the fifth predetermined one of the plurality of lowpass filtered sub-band signals.

26. The method of claim 18, wherein generating a plurality of lowpass filtered sub-band signals from the plurality of bandpass filtered sub-band signals comprises:

combining at least two sub-band signals from the plurality of bandpass filtered sub-band signals to generate a sub-band signal of the plurality of lowpass filtered sub-band signals.

27. The method of claim 26, wherein the predetermined one of the plurality of lowpass sub-band signals is formed by combining at least three sub-band signals from the plurality of bandpass filtered sub-band signals.

* * * * *

UNITED STATES PATENT AND TRADEMARK OFFICE
CERTIFICATE OF CORRECTION

PATENT NO. : 6,957,054 B2 Page 1 of 1
APPLICATION NO. : 10/216335
DATED : August 9, 2002
INVENTOR(S) : Junsong Li It is certified that error appears in the above-identified patent and that said Letters Patent is hereby corrected as shown below:

In Column 9, Line 65, Claim 16:

Change "The receiver of claim 15, wherein" to --The receiver of claim 12, wherein--

Signed and Sealed this

Twenty-seventh Day of May, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,957,054 B2 |
| APPLICATION NO. | : 10/216335 |
| DATED | : October 18, 2005 |
| INVENTOR(S) | : Junsong Li |

It is certified that error appears in the above-identified patent and that said Letters Patent is hereby corrected as shown below:

In Column 9, Line 65, Claim 16:

Change "The receiver of claim 15, wherein" to --The receiver of claim 12, wherein--

This certificate supersedes the Certificate of Correction issued May 27, 2008.

Signed and Sealed this

Twenty-fourth Day of June, 2008

JON W. DUDAS
*Director of the United States Patent and Trademark Office*